(No Model.) 2 Sheets—Sheet 1.
A. J. HOYT.
PEDAL FOR CRANK POWERS.
No. 518,757. Patented Apr. 24, 1894.
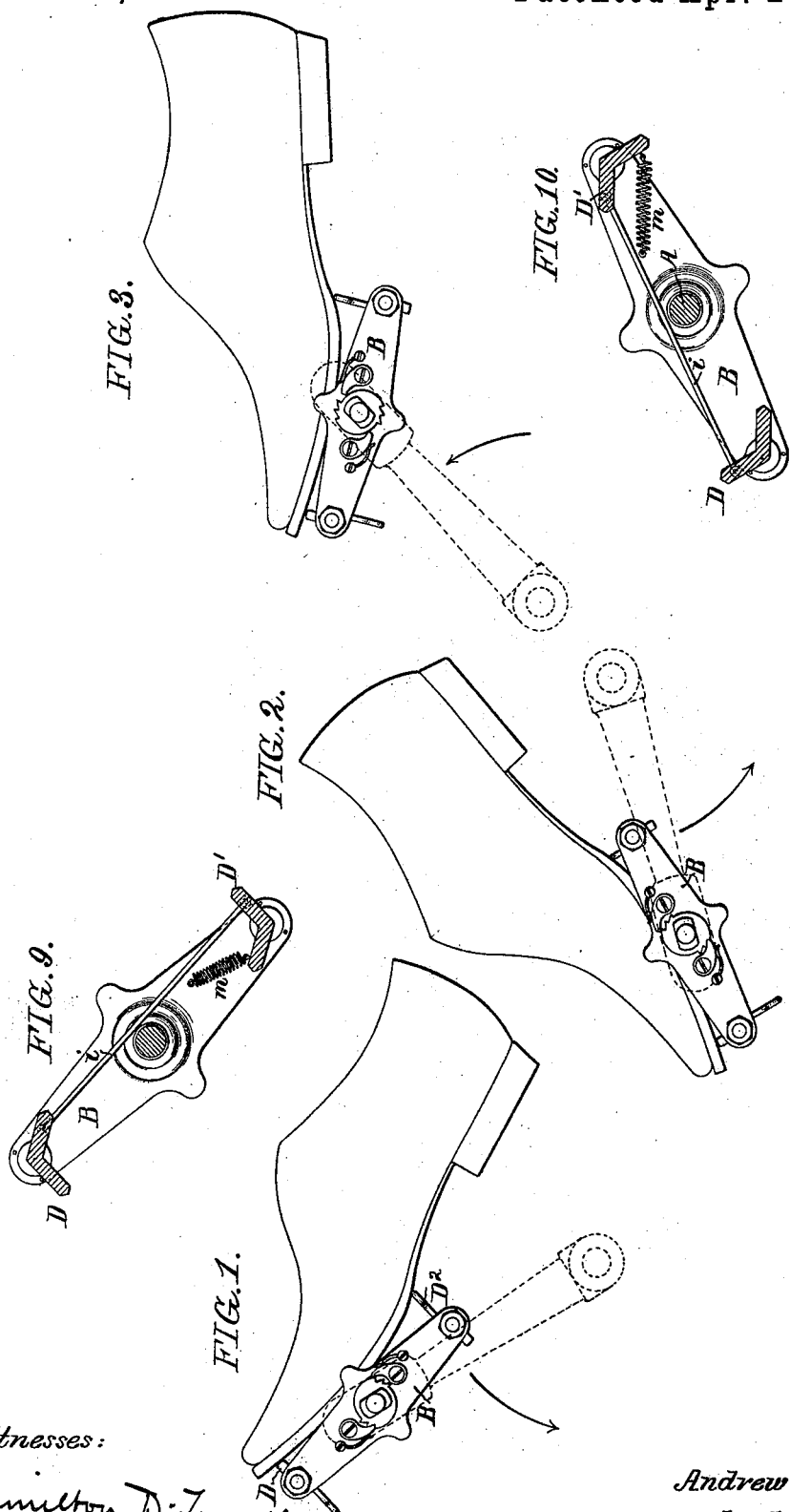
Witnesses:
Hamilton D. Turner
Frank E. Bechtold
Inventor:
Andrew J. Hoyt
by his Attorneys
Howson & Howson (No Model.) 2 Sheets—Sheet 2.
A. J. HOYT.
PEDAL FOR CRANK POWERS.
No. 518,757. Patented Apr. 24, 1894.
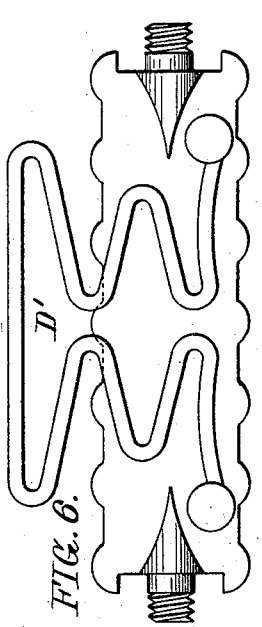
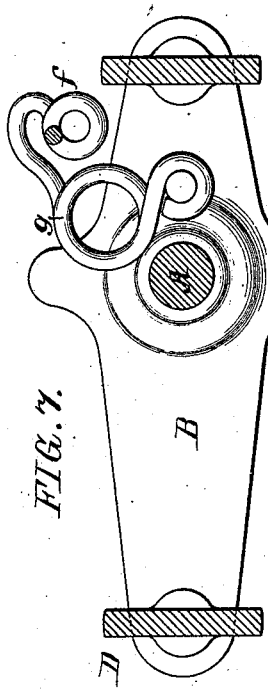
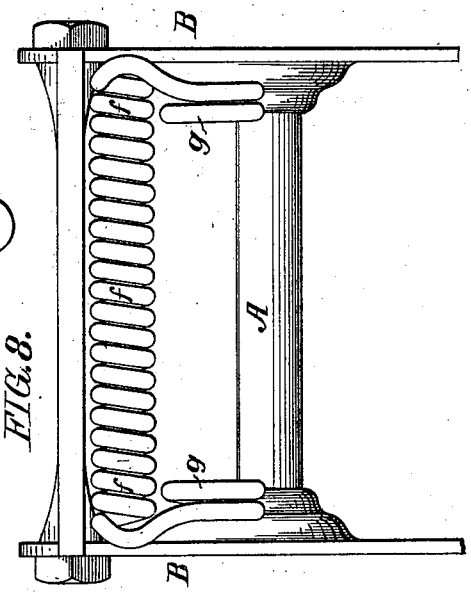
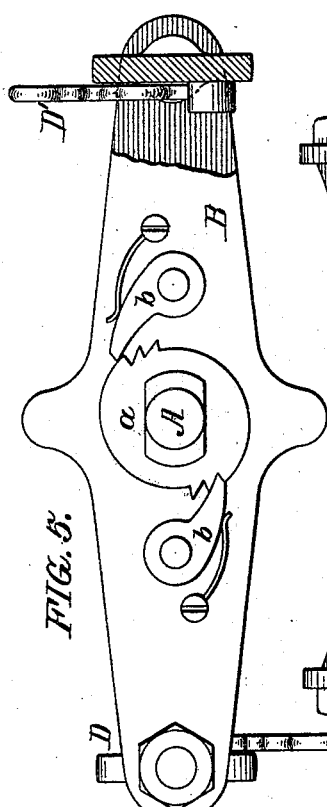
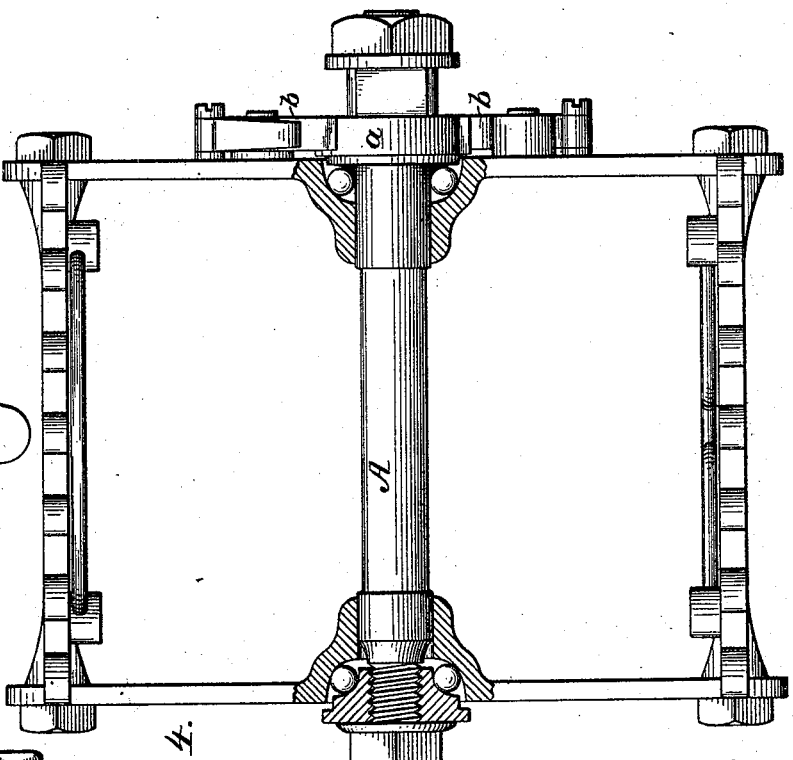
Witnesses:
Hamilton D. Turner
Frank C. Bechtold
Inventor:
Andrew J. Hoyt
by his Attorneys
Howson & Howson

UNITED STATES PATENT OFFICE.

ANDREW J. HOYT, OF PHILADELPHIA, PENNSYLVANIA.

PEDAL FOR CRANK-POWERS.

SPECIFICATION forming part of Letters Patent No. 518,757, dated April 24, 1894.

Application filed July 7, 1893. Serial No. 479,833. (No model.)

*To all whom it may concern:*

Be it known that I, ANDREW J. HOYT, a citizen of the United States, residing in Philadelphia, Pennsylvania, have invented certain Improvements in Pedals for Crank-Powers, of which the following is a specification.

My invention relates to certain improvements in that class of pedals for bicycles or other foot power machinery in which the pedal is combined with locking devices whereby it is prevented from turning forward on the pedal pin in order that power may be applied to the outer foot rest of the pedal on the descending movement of the crank without causing said pedal to turn on the pin, the effective length of the crank being thereby increased to the extent of the projection of the pedal forwardly beyond the pedal pin.

The object of my invention is to so construct such a pedal as to provide for the locking of the same in position for a somewhat longer time than heretofore, and this object I attain by providing the pedal with a yielding rear foot rest, which, under certain circumstances, is higher than the front foot rest, and under other circumstances is as low as or lower than said front rest. The manner in which this construction effects the object of the invention is fully set forth hereinafter.

In the accompanying drawings:—Figures 1, 2 and 3, are diagrams illustrating three different positions of a pedal constructed in accordance with my invention. Fig. 4, is a plan view of the pedal partly in section. Fig. 5, is a side view of the same, partly in section. Fig. 6, is a transverse section. Fig. 7, is a longitudinal section of another form of pedal showing a special construction of rear foot rest. Fig. 8, is a plan view of part of the same; and Figs. 9 and 10, are longitudinal sections of a pedal, illustrating another modification.

In the pedal shown in Figs. 1 to 6, A represents the pedal pin which is rigidly connected to the crank arm in any suitable manner and is provided with a toothed catch a, with which are adapted to engage a pair of spring pawls b carried by one of the side bars B of the pedal, these bars having ball bearings on the pedal pin so as to be free to turn backward on said pin, forward movement during the greater part of the downward stroke of the crank being resisted by engagement of the pawls and toothed catch so that on said downward stroke the pressure upon the outer foot rest D of the pedal serves to lock the latter to the pedal pin and thus increases the effective length of the crank to the extent of the distance between the pedal pin and said outer foot rest. The catch a may, if desired, be toothed throughout its entire periphery, although but a few teeth are actually required, as shown.

In a pedal of this character it is advisable that the pedal should be tilted upward as much as possible at the front end at the beginning of the downward thrust when the pedal is first locked to the crank, for the more the front of the pedal is tilted up at such time the longer will the pedal remain locked to the crank, that is to say, the longer will be the stroke before the foot touches the rear foot rest and throws the pedal backward. I therefore provide a rear foot rest D' which projects some distance above the level of the front rest D, said foot rest D' being elastic, so that it will serve as a support for the foot when subject to light pressure, but will yield to heavy pressure. When the crank is in the position shown in Fig. 1, therefore, the rear foot rest D' serves as a means of depressing the rear of the pedal to the desired extent without excessive inclination of the foot, the light pressure at this time exerted upon the pedal not being sufficient to compress the rear rest. When the pedal reaches the position shown in Fig. 2 the pressure of the foot is sufficient to compress the foot rest D', this operation resulting rather than the pressing down of the rear end of the pedal, because the pressure upon the front foot rest is still heavier than that required to compress the spring of the foot rest D', so that the pedal remains locked to the crank during that portion of the stroke in which the power can be most effectively applied. When the crank is rising, the pressure upon the foot rest D' serves to shift the position of the pedal, as shown in Fig. 3, and gradually lift the front end of the same until it finally again assumes the position shown in Fig. 1.

The elasticity of the rear foot rest may be effected in various ways, the plan shown in Fig. 6 being to bend the wire of which said rear foot rest is composed, so as to form a series of loops. A preferable plan in some cases, however, is to provide a foot rest in the form of a coil $f$ suspended from arms projecting from coils $g$ secured to the opposite side bars of the pedal as shown in Figs. 7 and 8, for instance.

In Figs. 9 and 10 I have shown a construction in which swinging or pivoted foot rests are used instead of the elastic foot rest, the front and rear rests being connected by a rod $i$ or other equivalent means, so that when the front rest is elevated the rear rest will be depressed, and vice versa. In this case the rear rest may be acted upon by a suitable spring, such for instance as shown at $m$, this spring tending to maintain the rest in the position shown in Fig. 9 until the forward thrust of the foot depresses the rear foot rest and lifts the front rest, this operation taking place after the pedal passes the position shown in Fig. 1, and before it reaches the position shown in Fig. 2.

The pedals shown in Figs. 1 to 6, and in Figs. 9 and 10 are reversible pedals, that is to say, they are centrally pivoted and are equally operative either side up, but it is preferable in some cases to pivot the pedal closer to the rear foot rest than to the front rest, as shown in Fig. 7, in order to provide for an increased amount of leverage when the pedal is locked to the crank.

Having thus described my invention, I claim and desire to secure by Letters Patent—

1. The combination of the crank, the pedal having a front foot rest in advance of the pedal pin, a yielding rear foot rest, and means for preventing the forward rotation of said pedal on the pedal pin, substantially as described.

2. The combination of the crank, the pedal having a front foot rest in advance of the pedal pin, an elastic rear foot rest, and means for preventing forward rotation of the pedal on the pedal pin, substantially as specified.

In testimony whereof I have signed my name to this specification in the presence of two subscribing witnesses.

ANDREW J. HOYT.

Witnesses:
FRANK E. BECHTOLD,
JOSEPH H. KLEIN.